3,306,817
METHOD OF REPELLING BIRDS
Andrew J. Reinert, Bartlesville, Okla., assignor to Phillips Petroleum Company, a corporation of Delaware
No Drawing. Filed Jan. 3, 1966, Ser. No. 517,906
4 Claims. (Cl. 167—46)

This invention relates to bird repellents. In one aspect, this invention relates to methods of rendering a locus repellent to birds. In another aspect, this invention relates to novel bird repellent compositions.

The task of deterring birds from resting on exposed surfaces such as window sills, roofs, and ledges of buildings has become a problem of major concern. Thousands of dollars are spent each year by property owners, especially in large metropolitan areas, to clean buildings which have been used as resting places for such birds as starlings, pigeons, sparrows and the like. Although devices such as scarecrows, noisemakers, etc., have been used with moderate success for discouraging birds from resting in open fields and the like, these devices are not suitable for use on or near large buildings which afford a variety of different resting places for birds. Moreover, these devices are continuously being replaced with the very successful bird repellent compounds disclosed in U.S. Patents 3,044,930, issued July 17, 1962, to Goodhue et al. and 3,150,041, issued September 22, 1964, to Goodhue et al. Although the compounds disclosed in the Goodhue et al. patents have proved very effective for their stated utilities, research efforts continue for better and different bird repellent compounds.

As a general rule, most birds do not like to roost on soft, greasy surfaces which may or may not exhibit slight tackiness. This postulate has led to the discovery of a variety of different materials which have come to be known as mechanical bird repellents. Materials of the prior art which exhibit these properties in various degrees have become known by such terms as rat glues, bird limes, bird jellies, and the like. Several commercial compounds are alleged to possess mechanical bird repellency. Many of these compounds become discolored with age and tend to lose their effectiveness as a bird repellent in a comparatively short time because they lose their consistency either by becoming hard or by separating into a liquid and a solid. Some of the mechanical repellents do not remain stable over a very broad temperature range. This characteristic of the compounds limits the areas in which the compounds can be used to those having minor variations in climatic temperature changes. Some of the compounds of the prior art tend to stain and corrode the surfaces to which they are applied. The tendency of these compounds to become stringy is also an undesirable side effect because it can result in the compound spreading to areas where it is not wanted such as beneath windows and between the joints in buildings.

According to this invention, these and other disadvantages of the prior art methods of repelling birds are overcome by a novel method of discouraging birds from resting on a locus including applying amorphous polypropylene to said locus. The amorphous polypropylene bird repellent composition of this invention does not possess the many undesirable characteristics of the mechanical repellents of the prior art.

Accordingly, it is an object of this invention to provide a method of repelling birds from a locus.

Another object of this invention is to provide a novel bird repellent composition.

A further object of this invention is to provide a simple and efficient method of preventing birds from resting on a surface.

These and other objects of the invention will become apparent to one skilled in the art after studying the following detailed description and the appended claims.

In the practice of this invention, birds can be repelled from a locus by applying to said locus amorphous polypropylene in an amount sufficient to render said locus repellent to birds.

The amorphous polypropylene employed in accordance with the method of this invention can be obtained as the product from a variety of different polymerization processes. For example, the amorphous polypropylene is normally formed in the polymerization of propylene to form crystalline polypropylene. It can be recovered from this reaction product by any suitable technique such as that described in Belgian Patent 538,782. The amorphous polypropylene can be separated and recovered from the total polymer reaction product because it is soluble in many hydrocarbon solvents such as xylene or pentane at a temperature and pressure wherein the crystalline polypropylene is insoluble.

The amorphous polypropylene can be used to repel birds from a locus in the form in which it is recovered from the hydrocarbon solvent. If desired, the recovered amorphous polypropylene can be refined to remove the unavoidably entrained catalyst residues and residual hydrocarbon solvents. It is generally preferred to subject the recovered amorphous polypropylene to a purification step because of the improved appearance of the product. The recovered amorphous polypropylene can be contacted with aqueous sulfuric acid in the form of a wash treatment which can be followed by contacting with a conventional filtration clay to remove catalyst residues, etc. The amorphous polypropylene employed in the practice of the present invention has a molecular weight in the range of about 2,000 to about 100,000 as determined by light scattering, a density (ASTM D1505–60T) in the range of about 0.83 to about 0.90 at 25° C., and a crystallinity of less than about 10 percent as determined by X-ray diffraction. It can be formed by polymerizing propylene with any catalyst system well known in the art. It must be understood that polypropylene produced by any suitable process can be used in the practice of the invention.

The amorphous polypropylene repellent of this invention can be applied to a locus from which birds are to be repelled by any suitable technique such as spraying, brushing, dusting, and the like. Suitable aerosol containers having an inert propellent can also be used for conveniently dispensing the amorphous polypropylene. It is also within the scope of the invention to disperse the amorphous polypropylene in a volatile or a nonvolatile hydrocarbon or other organic solvent or dispersant. A suitable emulsifier can also be used for providing an aqueous dispersion of the repellent. To achieve a more uniform application of the repellent, it is generally preferred to apply it to the surface in a liquid carrier selected from the group consisting of water, acetone, kerosene, ethyl acetate, and isoparaffinic hydrocarbons which boil in the range of about 260 to about 800° F.

Insofar as the repellent concentrations, it is necessary for the amorphous polypropylene to be applied to a locus in an amount sufficient to render the locus repellent to birds. Since the concentration can vary depending upon environmental conditions such as weather, the type of bird being repelled, and the surface from which the birds are to be repelled, the amount sufficient to render the surface repellent can vary over wide limits. Generally, it is preferred to provide the surface with amorphous polypropylene in an amount between about 0.01 to about 50 grams per square foot of surface. Amounts outside of this range can be used if desired.

The coverage of the surface to be made repellent need not be total. For example, the surface can be covered with narrow ribbons of the amorphous polypropylene in any geometric pattern such that it becomes difficult, if not impossible, for a bird to avoid contact with the repellent while resting on the surface.

A series of bird repellency tests was made in which amorphous polypropylene was evaluated. The following examples will illustrate the effectiveness of the amorphous polypropylene as a bird repellent. It is to be understood that these examples are for the purpose of illustration only and must not be considered to be limiting of the invention.

*Example I*

A cage eight feet long was constructed with ends measuring 6 inches wide at the bottom, 3 feet wide at the top, and 1½ feet wide at a point approximately midway between the top and the bottom. A roosting bar was secured to the interior surfaces of the sides such that it extended over the entire width of the cage. A system for exhausting air was attached to one end of the cage, and the opposite end of the cage was provided with a screen covered by a curtain which would allow air but not light to pass into the cage. A plurality of translucent panels was positioned on the top surface of the cage in order to allow diffused light to enter. This type of cage simulated natural roosting conditions for birds. A plurality of wires of small diameter were strung across the cage just above the bottom surface to discourage roosting on the bottom of the cage.

Two starlings were released in the cage and their conduct observed. After the starlings became accustomed to their surroundings, it was observed that they spent approximately 95 percent or more of the time on the roosting bar. A roosting index defined as the ratio of the time spent by the birds on the roosting bar to the total elapsed time was used to determine the effectiveness and the utility of the amorphous polypropylene. A perfect bird repellent will result in a roost index of 0. A roost index of 1 would indicate the birds spent all of the time on the roost. On the basis of data reflective of the activity of the starlings without any compound on the roosting bar, the roosting index was calculated to be in excess of 0.9.

Amorphous polypropylene, obtained as a hydrocarbon-soluble product in a propylene polymerization process catalyzed by contact with the $TiCl_3 \cdot \frac{1}{3} AlCl_3$ complex and diethylaluminum chloride, was deposited on the roosting bar by a spatula in an amount to provide a coverage estimated to be about 15 grams per square foot of roosting surface. On the basis of data collected from four different tests with two starlings in each test and employing the procedures outlined above, the roost index as defined above was calculated to average 0.005 for the four tests. This average indicates that the starlings spent less than 1 percent of the time resting on the treated roosting bar.

*Example II*

A cage having two roosting bars, one in each end, was employed to determine the effectiveness of the amorphous polypropylene as a repellent under conditions when the birds had a choice of roosting places. The bottom of the cage was immersed in a vessel containing water so that the roosting bars afforded the only horizontal resting surface. The sides of the cage were constructed of wire to discourage the birds from clinging to them. Four starlings were released in the cage. After they became accustomed to their surroundings it was observed that they spent about equal time on both roosting bars. Amorphous polypropylene was then applied to one of the roosting bars to provide a coverage estimated to be about 15 grams per square foot of roosting bar surface. Observations made at 15-minute intervals over a period of one hour revealed that none of the starlings rested on the roosting bar having the amorphous polypropylene. Although the starlings appeared uncomfortable and crowded, all four birds attempted to rest on the untreated roosting bar.

In a modification of this example, both roosting bars were coated with the amorphous polypropylene described in Example I and the conduct of four starlings observed at 15-minute intervals for a period of one hour. None of the starlings were resting on the roosting bars at the time the readings were taken. In all cases, the birds were fluttering in the water or attempting to cling to the sides of the cage. The data from this example indicate the very effective repellency of the amorphous polypropylene of this invention.

Although the invention has been described in considerable detail, it is to be understood that such detail is for the purpose of illustration only. It is apparent that many variations and modifications can be made without departing from the spirit and scope of the invention.

I claim:
1. A method of repelling birds from a locus which comprises applying to said locus amorphous polypropylene in an amount sufficient to render said locus repellent to birds.
2. A method according to claim 1 wherein said amorphous polypropylene is applied in an amount to provide between about 0.01 to about 50 grams of amorphous polypropylene per square foot of said locus.
3. A method according to claim 1 wherein said amorphous polypropylene is applied to said locus in an organic dispersant.
4. A method according to claim 1 wherein said amorphous polypropylene is applied to said locus in a liquid carrier selected from the group consisting of water, acetone, kerosene, ethyl acetate, and isoparaffinic hydrocarbons which boil in the range of about 260 to about 800° F.

References Cited by the Examiner

Pest Control 30(g), September 1962, p. 18.

SAM ROSEN, *Primary Examiner.*

S. J. FRIEDMAN, *Assistant Examiner.*